Feb. 14, 1956 T. B. HAYES 2,734,458
PUMP SPEED CONTROL ARRANGEMENT
Filed Feb. 5, 1952 2 Sheets-Sheet 1
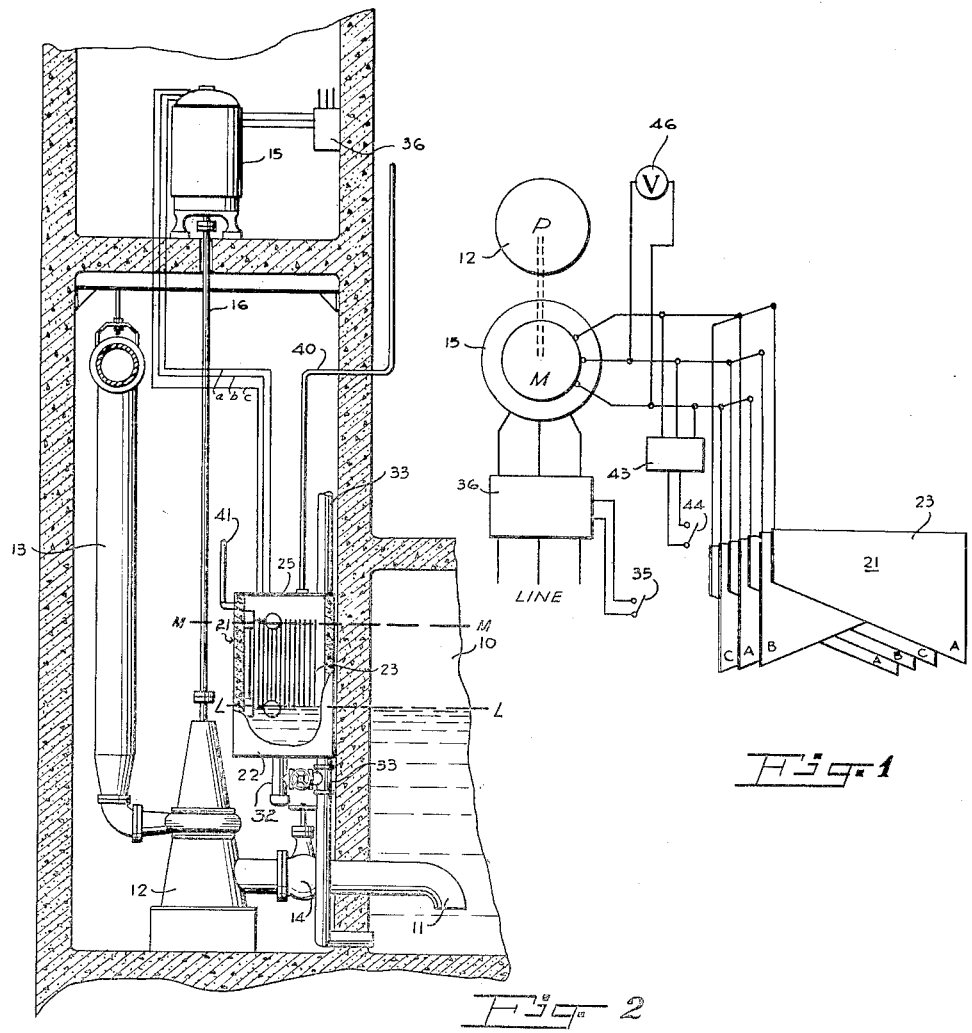
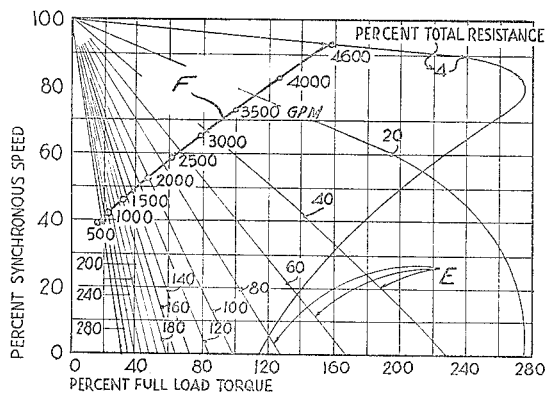
Thomas B. Hayes
INVENTOR.
BY
Buchanan and Cheatham
ATTORNEYS INVENTOR.
Thomas B. Hayes
BY
Burkham and Cheatham
ATTORNEYS United States Patent Office 2,734,458
Patented Feb. 14, 1956

2,734,458

PUMP SPEED CONTROL ARRANGEMENT

Thomas B. Hayes, Corvallis, Oreg.

Application February 5, 1952, Serial No. 270,086

9 Claims. (Cl. 103—35)

The present invention relates to a motor speed control arrangement and more particularly to an arrangement for automatically controlling the speed of a motor-driven sump pump.

The quantity of liquid flow in sewage systems, water treatment plants and similar installations will vary decidedly throughout the day and season so that the pumping installations to handle this variable flow must be extremely flexible. In some instances multiple pumps of small sizes have been arranged in the liquid-receiving sump or wet well of a pumping installation of such a variable flow system and are brought into action as required to handle the flow by use of liquid level control switches. Such a stepped pumping process requires a relatively large well and considerable electrical equipment which must be inspected and maintained and repaired. Moreover, the capital investment in a system employing a plurality of small pumps is relatively high because of the high unit cost of the equipment and large space requirements.

The use of small pumps is complicated in sewage plants and similar systems handling sludge materials because of the clogging action of the sludge and the surging effect caused by the on-off operation of the pumps can reduce the efficiency of the hydraulic and biological processes of the plant itself. Though the liquid flow rate may vary from time to time, the rate of change is generally gradual so that if the liquid could be continuously discharged from a receiving sump of the system at substantially the same rate at which it flows thereto, the disturbing surges could be substantially eliminated. Such a continuous operation would in some cases provide an improvement in the process under consideration and would also permit the use of a few large pump and motor units rather than a large number of smaller units. This would, of course, reduce the capital investment and, if the pumps and motors ran substantially continuously, a further advantage is realized inasmuch as expensive motor starting devices may be eliminated. In addition, the electric utility serving the pumping installation is relieved of the burden of providing motor starting currents in excess of the motor running currents. A still further economic advantage is realized in continuous operation in that it is frequently possible to employ less efficient motors and pumps and still have the same net overall operating costs as would be obtained if more efficient motors and pumps were installed.

It is an object of the present invention, then, to provide a new and improved, automatic pump motor control arrangement.

It is another object of the present invention to provide a pump motor control arrangement permitting the efficient use of inexpensive pumps and motors for driving the pumps.

It is a still further object of the present invention to provide a pump motor control arrangement for a pump in a liquid system in which the liquid in flow rate varies and wherein the discharge rate of the pump to handle such liquids is automatically varied relative to the liquid flow rate to the pump.

A more specific object of the invention is to provide a new and improved automatic liquid rheostat control arrangement for a sump pump motor.

A further object of the invention is to provide an economically operating pumping system.

In accordance with an illustrated embodiment of the present invention, a wound rotor, induction-type electric motor is utilized to drive a centrifugal pump the inlet of which is arranged in a sump into which water or sewage and the like flows at varying rates. The speed of the motor is regulated by a liquid rheostat connected across the secondary windings of the motor and operatively arranged with the sump whereby the resistance of the rheostat is controlled by the liquid level in the sump and controlled in such a manner as to cause the motor to drive the pump at all times at a discharge rate approximately equal to the rate of liquid inflow to the sump.

The objects and advantages of the present invention will be more readily understood from a study of the following specification taken in connection with the accompanying drawings wherein like numerals refer to like parts throughout.

In the drawings,

Fig. 1 is a schematic diagram showing the arrangement of the elements of my invention;

Fig. 2 is a side elevation, partly broken away, showing the arrangement of the pump, motor and liquid rheostat with a liquid sump from which liquid is to be pumped;

Fig. 3 is a graph showing the torque-speed characteristics of a typical wound rotor induction motor and the torque-speed characteristics required for the operation of a typical centrifugal pump;

Figure 4:
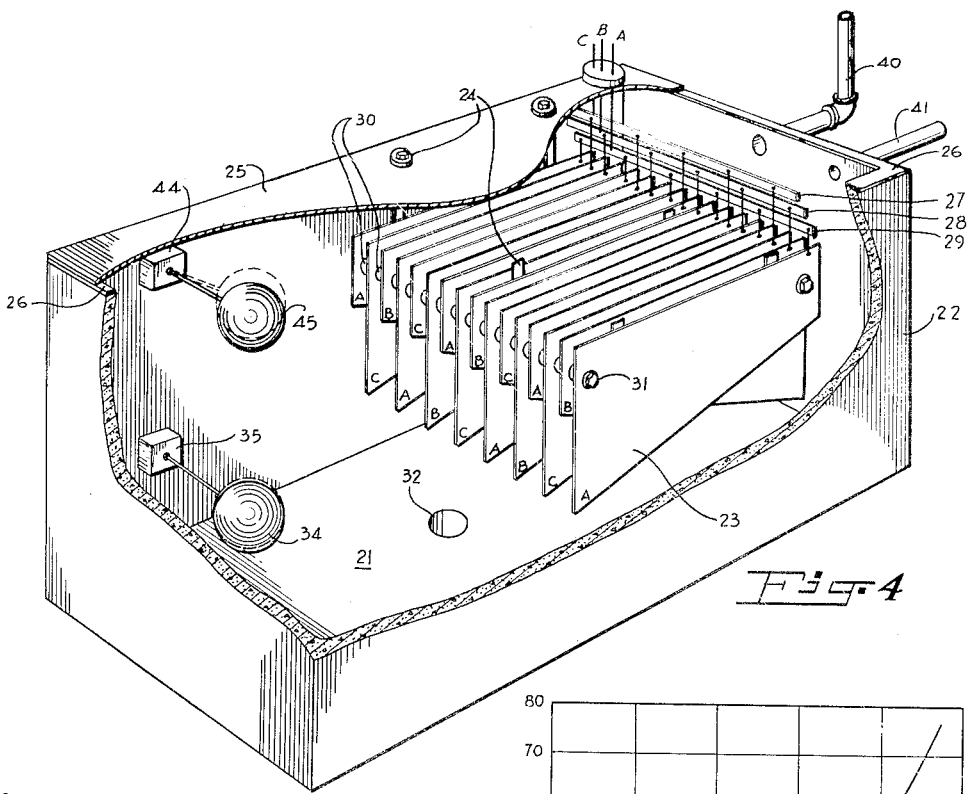
Fig. 4 is an enlarged perspective view of the liquid rheostat, a portion of the housing being broken away to show the internal details of construction.

The invention will now be described with particular reference to Figs. 1, 2 and 4. As stated above, the present invention is particularly adapted for liquid systems wherein liquid flows at varying rates into a liquid sump in which it is desired to maintain a given liquid level and from which it is desired that the liquid be discharged at a rate approximately equal to the rate of liquid inflow thereto. In the drawings, the sump or pump well of such a system is represented at 10 in which is arranged the inlet pipe 11 of a centrifugal pump 12 adapted to discharge liquid through an outlet pipe 13. The inlet pipe 11 is provided with a shut-off valve 14. In accordance with the present invention, an electric motor is provided to drive the pump selected from the class of motors adapted to be driven between predetermined minimum and maximum rates inverse to resistance values selected within the range of the predetermined minimum and maximum values of an external resistance element electrically connected to the motor in such a manner that a change in the resistance value will cause a change in the motor speed. An example of such a motor is the wound rotor, induction type motor 15 which is connected to the pump 12 so as to drive the pump at a speed proportional to the motor rate, the motor as illustrated being directly coupled to the pump through a shaft 16.

Referring now to Fig. 3, there are illustrated typical torque-speed characteristic curves E for a wound rotor, induction type motor. A characteristic of wound rotor motors is that a change in the resistance of the rotor circuit produces a change in the shape of the torque-speed curve. In general, for a given load, as the rotor circuit resistance is increased percentagewise, the motor speed is decreased. The percentage resistance values indicated by the curves E in Fig. 3 were computed on the basis that 100 per cent total resistance is that rotor resistance which will provide 100 per cent torque at zero speed. Also plotted in Fig. 3 is the discharge characteristic curve F for a typical centrifugal pump driven by a direct connected motor. The shape of this curve F is a function of the connecting piping as well as of the pump's characteristics. The points of intersection of the pump's discharge characteristic curve F with the motor's characteristic torque-speed curves E indicate the speed at which the motor and pump would operate for the several external rotor circuit resistances plotted. As may be seen, with an infinite number of characteristics the pump and motor speed and the pump discharge would be continuously variable or adjustable from zero discharge to the maximum capabilities of the pumping unit.

It has been proposed heretofore to effect a change in rotor resistance to control the motor speed by providing a cast-iron or a stainless steel resistor tapped along its length at several points, each point being connected to a short-circuiting contactor which may be controlled by a float arranged in the liquid sump. Such a system of operation has the disadvantage of providing speed control in discreet steps which results in surges in the pump discharge which are not desirable in some instances, as before explained. Cast-iron grid resistors and stainless steel resistors are, moreover, costly and occupy expensive space, and the short-circuiting contactors are complicated and require maintenance along with the pilot devices necessary for their operation. In addition, considerable heat is generated in the external resistors and some means must be provided for dissipating this heat.

In the present invention the above disadvantages are eliminated by providing a speed regulating device for the motor in the form of a liquid rheostat 21 adapted to control the speed of the motor relative to certain variations in the elevation of liquid in the sump 10. The rheostat 21 comprises a casing 22 within which are mounted parallel, spaced-apart plates or electrodes 23 suspended vertically by hangers 24 insulated from the casing cover plate 25. The rheostat may be made watertight by inserting a gasket 26 between the cover plate and the top wall of the casing 22. Preferably the electrodes 23 are of a corrosion resisting material such as stainless steel, but may be of any electrically conductive material such as cast iron or copper, and are connected in regular rotation of the phases A, B, C to the respective bus bars 27, 28 and 29, as may be best observed in Fig. 4, which are in turn connected by electrical conductors to the terminals of the rotor of motor 15. The plates 23 are insulated from one another by insulators 30 mounted upon a through rod 31, the insulators 30 being formed of a suitable material which has high dielectric strength not damaged when immersed in water, which is not easily carbonized, and has considerable mechanical strength, such materials being known to the art and forming no part of the present invention. Means are provided to form a liquid connection between the bottom of the casing 22 and the sump 10 whereby the elevation of liquid in the casing 22 will conform to the elevation of the liquid in the sump. Such a connection is made between casing outlet 32 and pipe 33, the latter being in communication with sump 10 at the bottom thereof. Casing 22 is formed so as to have a vertical height at least equal to the distance between the given level represented by line L—L it is desired to maintain in the sump, and a predetermined maximum level represented by the line M—M, and is located so that the given liquid level and maximum liquid level fall within the vertical limits of the casing 22 as shown. The electrodes 23 are formed and suspended whereby their vertical limits fall substantially along the respective level elevations.

The area of immersion of the electrodes 23 will increase as the liquid level rises above the level L—L so that the electrical resistance between the plates diminishes as the liquid rises. Though the aim of the invention is to provide a motor control arrangement whereby the pump 12 will discharge liquid from the sump 10 at the rate at which it flows thereto, this result is obtained indirectly, that is, the pump speed is actually controlled by the relative height of liquid between the given level L—L and the maximum level M—M. To obtain the desired result of the invention, the electrodes 23 are so shaped that the electrical resistance between them decreases as the water rises above the level L—L to cause the motor at any given time to drive the pump at a rate between predetermined minimum and maximum rates proportional to the relative height of liquid between the given liquid level L—L and the maximum level M—M. The actual discharge rate for a given pump speed in any particular system will depend upon the characteristics of the system. As will be observed from Fig. 3, the ratio of pump speed to pumping rate is not directly proportional since at the slower speeds of the pump a given increase in speed will create a larger change in the discharge rate of the pump than will the same incremental increase at the higher range of pump speed, and it is necessary that the plates 23 be so shaped that a smaller change in resistance and consequently a smaller change in motor speed will result from a given increase in the liquid level in the sump near the line L—L than near the line M—M. The particular shape which will be required for the electrodes in any given installation will be dependent upon the characteristics of the pump, the motor and the pumping system, but for the system plotted in Fig. 3 the trapezoidal form of the electrodes substantially as illustrated in Figs. 1 and 4 was found to accomplish the desired results.

It is not necessary for the pump to operate when the liquid level is below level L—L, so I have provided an on-and-off switch 35 actuated by float 34 which operates the motor starting unit 36 to start the motor 15 when the liquid level rises above line L—L. If the liquid inflow rate to sump 10 is so great as to cause the liquid level therein to rise above line M—M, it is desired, of course, that the motor run at its maximum speed. Thus I have provided a short-circuiting contactor 43 which is operated by the switch 44 actuated by float 45. Contactor 43 is effective to short-circuit the rotor winding of the motor 15 and thereby eliminate the resistance remaining between the electrodes of the liquid rheostat and cause the motor to operate at its maximum rate when the liquid level rises above M—M to cause closure of switch 44.

If the sump 10 is connected in a sewage system or some other system in which the liquid carries a sludge forming material, it is preferred that some means be provided for preventing the sludge from entering the casing 22. This result is accomplished in the present invention by continually supplying clear water to the casing 22 from a suitable source through a line 40 connected to the casing. The constant addition of water to the casing 22 will create a general liquid flow from the casing to the sump and prevent the flow of the sludge-filled liquid into the casing. Casing 22 should be provided with some means for venting the air therefrom when it is sealed, such as the vent line 41. In systems wherein there is no danger that the electrodes of the rheostat would be sludged to disturb the characteristics of the rheostat, the electrodes could be arranged directly within the sump 10 so that the actual liquid therein would act as the conducting fluid between the plates.

Figure 6:
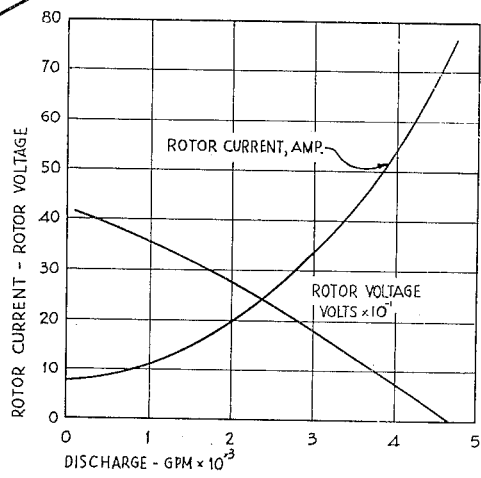
Fig. 6 is a graph illustrating the relationship of rotor current and voltage of a typical wound rotor induction motor to the discharge rate of a pump driven by the motor.

The curves of Fig. 6 show the relation of the rotor current and rotor voltage plotted against the discharge rate of a pump driven by the motor. It can be seen that these curves are such that a meter, which may be a volt meter 46, as shown schematically in Fig. 1, or ammeter suitably connected, may be calibrated in terms of pump discharge and connected across the secondary windings of the motor 15 in a known manner to obtain a relatively accurate reading of the pump discharge rate.

Figure 5:
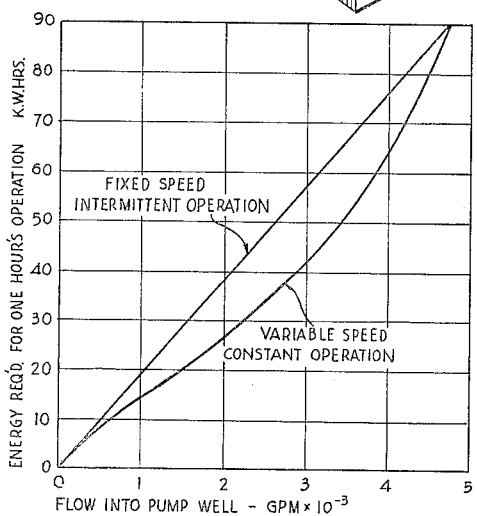
Fig. 5 is a graph illustrating the relative energy requirements for variable speed-constant operation of a pump and motor and the fixed speed-intermittent operation of the same motor and pump.

That the present invention is economical in operation is illustrated by the data plotted in Fig. 5 which shows the lower relative energy requirements of the pump and motor installation when operated constantly but at variable speeds to meet the flow into the pump well versus the energy requirements of the same motor and pump if operated at fixed speed and intermittently to discharge liquid accumulating in a sump. This economy of operation enables the use of less efficient types of pumps and motors.

It should be apparent that the invention is adapted for installation in any type of system wherein the liquid has a degree of electrical conductivity comparable to ordinary water or sewage.

Having described and illustrated a preferred embodiment of the present invention, it should be apparent that this permits of modification in arrangement and detail. I claim as my invention all such modifications as come within the true spirit and scope of the appended claims.

I claim:

1. In a system for handling a liquid containing refuse wherein said liquid flows at varying rates into a liquid sump in which it is desired that the liquid be maintained at a given level and from which the liquid is to be exhausted by a pump having its inlet extending into said sump, the invention comprising a wound rotor induction type electric motor connected to said pump for driving the same, a liquid rheostat including a plurality of spaced-apart, vertical electrodes, electrical conductors connecting the terminals of said rotor to different ones of said electrodes, a casing having a vertical height at least equal to the distance between said given level and a maximum predetermined liquid level and located so that said given and maximum liquid levels fall within the vertical limits of said casing, a liquid connection between said casing and said sump whereby the level of liquid in said sump will be maintained in said casing, said electrodes being fixedly suspended in said casing and extending between said given and maximum levels, said electrodes being so shaped that the resistance of said rheostat at any selected liquid level between said given and maximum levels is such that the speed of said motor is regulated to drive said pump at a relative discharge rate proportional between predetermined minimum and maximum rates to the relative height of liquid in such sump between said given and maximum levels, and means for constantly supplying a flow of water to said casing to maintain a general flow of liquid from said casing to said sump through said liquid connection whereby refuse is prevented from entering said casing.

2. In a system for handling a liquid wherein said liquid flows at varying rates into a liquid sump in which it is desired that the liquid level be maintained at a given level and from which the liquid is to be exhausted by a pump having its inlet extending into said sump, the invention comprising a wound rotor induction type electric motor connected to said pump for driving the same, a liquid rheostat including a plurality of spaced-apart, vertical electrodes, electrical conductors connecting the terminals of said rotor to different ones of said electrodes, a casing having a vertical height at least equal to the distance between said given level and a maximum predetermined liquid level and located so that said given and maximum levels fall within the vertical limits of said casing, and a liquid connection between said casing and said sump whereby the level of liquid in said sump will be maintained in said casing, the said electrodes being fixedly suspended in said casing and extending between said given and maximum levels, said electrodes being so shaped that the resistance of said rheostat at any selected liquid level between said given and maximum levels is such that the speed of said motor is regulated to drive said pump at a relative discharge rate proportional between predetermined minimum and maximum rates to the relative height of liquid in said sump between said given and maximum levels.

3. The invention as defined in claim 2 wherein an ammeter calibrated in terms of pump discharge is connected in the rotor circuit of said motor.

4. The invention as defined in claim 2 wherein a voltmeter calibrated in terms of pump discharge is connected in the rotor circuit of said motor.

5. In a control arrangement for a liquid system wherein liquids flows at varying rates to a liquid chamber in which it is desired to maintain a given liquid level, the combination comprising an electric motor adapted to be driven between predetermined minimum and maximum rates inverse to resistance values selected within the range of the predetermined minimum and maximum values of an external resistance element electrically connected to said motor, a liquid pump driven by said motor connected to said chamber for pumping liquid therefrom, a liquid rheostat forming said external resistance element and comprising a plurality of spaced-apart, vertical electrodes, means electrically connecting said electrodes to said motor in a manner whereby a change in resistance between said electrodes will cause a change in the speed of said motor, said electrodes being suspended in said chamber so as to be increasingly immersed as the liquid level in said chamber rises above said given level, said electrodes being so shaped that the electrical resistance therebetween varies from said predetermined maximum to said minimum resistance values as the height of liquid in said chamber increases from said given level to a predetermined maximum level to cause said motor to drive said pump at a discharge rate between predetermined minimum and maximum rates proportional to the relative height of liquid in said chamber, means responsive to an increase in liquid level in said chamber above said given level to start said motor, and means responsive to an increase in liquid level to said maximum level to short-circuit said external resistance element whereby said motor will be driven at its maximum rate.

6. A pumping system adapted to maintain a given liquid level in a chamber wherein the rate of liquid inflow to said chamber varies, comprising a pump connected to remove liquid from said chamber, and electric motor adapted to be driven between predetermined minimum and maximum rates of speed inverse to resistance values selected within the range of the predetermined minimum and maximum values of an external resistance element electrically connected to said motor, means operatively connecting said motor to said pump for driving the same, a liquid rheostat forming said external resistance element and comprising a plurality of spaced-apart, vertical electrodes, means electrically connecting said electrodes to said motor in a manner whereby a change in resistance between said electrodes will cause a change in the speed of said motor, said electrodes being fixedly suspended in said chamber so as to be increasingly immersed as the liquid level in said chamber rises above said given level, said electrodes being so shaped that the electrical resistance therebetween is varied by the liquid level in said chamber between said predetermined minimum and maximum resistance values in such a manner as to cause the said motor to drive said pump at a discharge rate between predetermined minimum and maximum rates proportional to the relative height of liquid in said chamber between said given level and a predetermined maximum level.

7. In a pump motor control arrangement for a system including a liquid sump, a pump having its inlet extending into said sump to exhaust liquid therefrom, an electric motor to drive said pump, and a speed regulating device connected to said motor including a liquid rheostat adapted to control the speed of said motor relative to the resistance thereof, the resistance of said rheostat being regulated by the elevation of liquid in said sump; the invention comprising a casing adapted to receive the electrodes of said rheostat therein, means forming a liquid connection between said casing and said sump whereby the elevation of liquid in said casing will conform to the elevation of the liquid in said sump, said electrodes being fixedly suspended in said casing whereby their depth of immersion increases and the electrical resistance between them decreases as the liquid level in said sump rises, a source of water, and means forming a fluid connection from said source to said casing for constantly supplying water thereto to cause a general flow of liquid through said liquid connection from said casing to said sump.

8. A pump control arrangement adapted to maintain a given liquid level in a chamber wherein the rate of liquid inflow varies, comprising a pump connected to remove liquid from said chamber, a wound rotor induction type electric motor operatively connected to said pump for driving the same, means responsive to an increase in the liquid level in said chamber to said given level for starting said motor, a liquid rheostat comprising a plurality of spaced-apart, vertical electrodes, electrical conductors connecting the terminals of said rotor to different ones of said electrodes, said electrodes being fixedly suspended in said chamber whereby the depth of their immersion varies with the liquid level in said chamber, said electrodes being so shaped that the electrical resistance between the plates at any given time is such that the speed of the motor is regulated to drive said pump at a discharge rate between predetermined minimum and maximum rates proportional to the relative height of liquid in said chamber between said given level and a predetermined maximum level, and means responsive to increase of liquid level to said maximum level to short-circuit said liquid rheostat whereby said motor will operate at maximum speed.

9. A pump control arrangement adapted to maintain a given liquid level in a chamber, comprising a pump arranged to withdraw liquid from said chamber, a wound rotor, induction type electric motor connected to said pump for driving the same, a liquid rheostat including a plurality of spaced-apart electrodes, electrical conductors connecting the terminals of said rotor to different ones of said electrodes, said electrodes being fixedly suspended in said chamber so as to be increasingly immersed as the liquid rises above said given level, said electrodes being shaped and arranged whereby the electrical resistance therebetween diminishes as the liquid rises about the electrodes and at any given liquid level the resistance is such that the speed of the motor is regulated to drive said pump at a discharge rate between predetermined minimum and maximum rates proportional to the relative height of liquid in said chamber between said given level and a predetermined maximum level.

References Cited in the file of this patent

UNITED STATES PATENTS

| | | |
|---|---|---|
| 1,633,786 | Horter | June 28, 1927 |
| 1,785,480 | Durdin, Jr. | Dec. 16, 1930 |
| 1,942,241 | Duhme | Jan. 2, 1934 |
| 2,147,422 | Bendz | Feb. 14, 1939 |
| 2,394,220 | Wagner | Feb. 5, 1946 |
| 2,447,087 | Ostrander | Aug. 17, 1948 |
| 2,468,791 | Thomson | May 3, 1949 |
| 2,482,496 | McGillivray | Sept. 20, 1949 |
| 2,516,386 | Hofer | July 25, 1950 |